Jan. 1, 1957 A. R. MOSLER 2,775,947
REPOSITORY OR SAFE
Filed Sept. 18, 1951 6 Sheets-Sheet 1

INVENTOR.
ARTHUR R. MOSLER
BY
ATTORNEY.

2,775,947

Patented Jan. 1, 1957

2,775,947

REPOSITORY OR SAFE

Arthur R. Mosler, New York, N. Y., assignor to The Mosler Safe Co., New York, N. Y., a corporation of New York Application September 18, 1951, Serial No. 247,033

15 Claims. (Cl. 109—47)

The present invention relates to repositories or safes and is more particularly directed toward repositories or safes suitable for use in the safekeeping of individual money boxes for the members of a sales force.

In mercantile establishments employing a large number of sales persons, elaborate provisions are necessary for the checking and auditing of their transactions. Where the sales force handles cash transactions with the customers, it is customary to provide each sales person with a known amount of change—coins and bills of various denominations. The distribution of such change to the sales force on arrival and the collection of it from them on departure involves a great deal of detail and consumes in the aggregate a great deal of time by the sales personnel. This loss becomes very substantial in large department stores where large numbers of sales persons have to report night and morning at the comptroller's or auditor's office to secure change for the day's business and to turn in all receipts at night.

The present invention relates to a safe or repository suitable for handling and storing in a safe manner individual money boxes, one for each sales person employed in a department, on a floor of such a store.

The invention contemplates that each member of the sales force will have some form of money box in which the coins and change allotted to that individual can be kept while not in the direct custody of the individual. Instead of having the person take the coin boxes and contents to the auditing office at the close of business and obtain them from the auditor in the morning or at the opening of business, a number of the coin boxes are, according to the present invention, kept, when not in use by the sales person, in a location where they are readily available, not only to that person but to the auditors whenever supervision is required. At other times, the money boxes are in a suitable protective safe or cabinet.

In order to conveniently provide for the safekeeping of the individual money boxes, accessibility of the money box to the proper individual entitled to use it, and accessibility by the auditors to all money boxes, the repository or safe is provided with one or more sub-safes or secondary cabinets which can be housed entirely within the main safe or repository and protected by its lock, or can be moved outwardly into an accessible position usually in front of the open side of the safe. In such position a number of sales persons, provided with proper keys, may have easy access. Ordinarily two of the sub-safes or secondary cabinets would be provided with each main safe and mounted on hinges so as to be swung from one position to the other with a minimum of effort.

According to the present invention, each sub-safe or secondary cabinet is divided into a number of compartments or pigeon-holes by means of suitable partitions. Each pigeon-hole is adapted to receive a money box. Like money boxes will be positioned similarly with compartments. Access to each compartment may be had through a lock, either by the individual sales person, or by a master key retained by the auditor. Where the boxes are to be checked frequently, the front of the sub-safe or compartmented secondary cabinet may be provided with a frame or grille, lockable in position by a master lock and carrying a lock for each compartment. When the frame carrying the individual locks is located in place across the front of the compartmented cabinet, access may be had to each compartment only when the corresponding lock is in the proper position and when that lock is in the other position one cannot insert the money box or remove it. The lockable grille need not be used, however, for where inspections are infrequent, the use of a master key in each lock makes it possible to check the cabinets of any compartment at any time.

Thus, in any case, the auditor and sales force personnel may have maximum assurance of safety of the funds, and accessibility to authorized persons only in an expeditious and time saving manner.

Various forms of money box may be employed. A suitable form is indicated. They carry suitable indicia for identification and are preferably shaped so that they can be locked in place in a normal position when assigned to a user and in another position when not assigned. Neither the box nor the compartments are intended for use as holders for the bulk of the receipts of the sales person. Such receipts are deposited by the sales person preferably in a receiver especially adapted and designed for the purpose and conveniently available to the sales force so as to make it unnecessary to make deliveries, or collections in person, all as shown in my application Serial No. 247,032, filed September 18, 1951, now Patent No. 2,735,541.

The accompanying drawings show, for purposes of illustrating the present invention, two embodiments in which the invention may take form, together with modifications of certain parts, it being understood that the drawings are illustrative of the invention rather than limiting the same.

In the drawings Figures 1–4, an external or protective cabinet is indicated at 20. This may be an ordinary safe of suitable design having the usual safe door indicated at 21, with combination lock normally provided with such safes. It may or may not be mounted on casters, if desired. They are omitted from the drawings.

Figure 1:
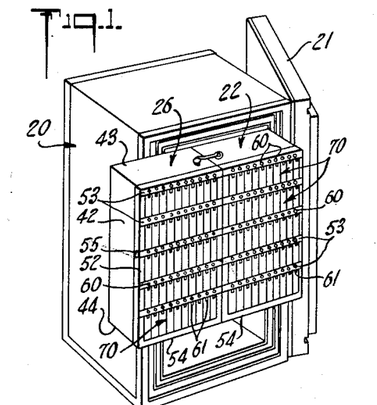
Figure 1 is a perspective view of a repository or safe showing the door of the main safe or cabinet opened and two sub-safes or secondary cabinets in position in front of the main safe to provide access to a number of money boxes.
Figure 2:
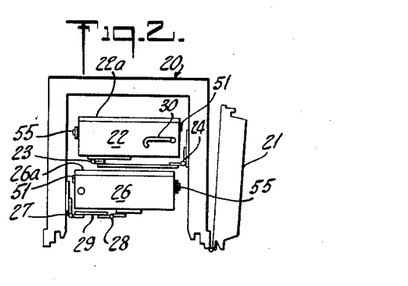
Figure 2 is a diagrammatic horizontal sectional view illustrating the main safe with door open and the two sub-safes or secondary cabinets inside the main safe or cabinet.
Figure 3:
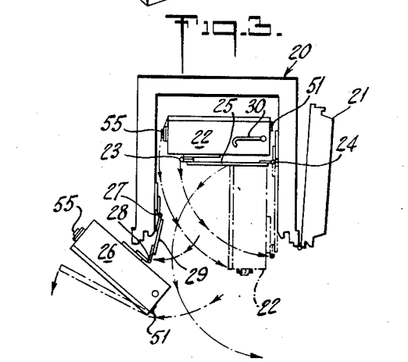
Figures 3 and 4 are views similar to Figure 2, Figure 3 indicating diagrammatically the shifting of the two secondary cabinets or sub-safes out from the main safe, and Figure 4 indicating them in the same position as in Figure 1.
Figure 4:
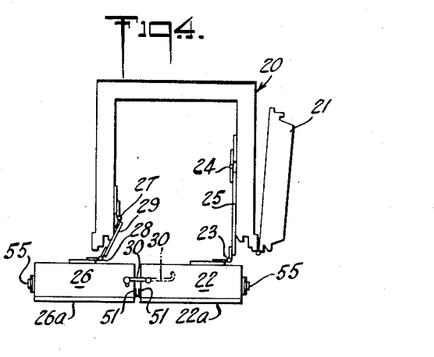

A secondary cabinet or sub-safe 22 is secured to the inner wall of the main safe or cabinet 20 by two hinges indicated at 23 and 24, these hinges being connected together by plate 25 of such size as to permit the cabinet 22 to swing from the full line position of Figures 2 and 3 to the dotted line position of Figure 3, and then to the full line position of Figures 1 and 4. Another similar secondary cabinet or sub-safe 26 is mounted on the other inner wall of the main safe 20 by hinges indicated at 27 and 28 and intermediate plate 29. These parts are so arranged that the sub-safe or secondary cabinet 26 can be swung from the full line position of Figure 2 to the full line position of Figure 3 and back to the full line position of Figures 1 and 4.

It will be apparent from the drawings that the faces 22a and 26a of the secondary cabinets or sub-safes are at the front when in position taken in Figure 4 and are at the rear when these sub-safes are in the main safe as indicated in Figure 2. The sub-safes may be secured in the position of Figure 4 by a hook indicated at 30. When the parts are in the position shown in Figure 4, the secondary cabinets or sub-safes 22 and 26 are in line to provide an extended area which is accessible from the front.

Figure 7:
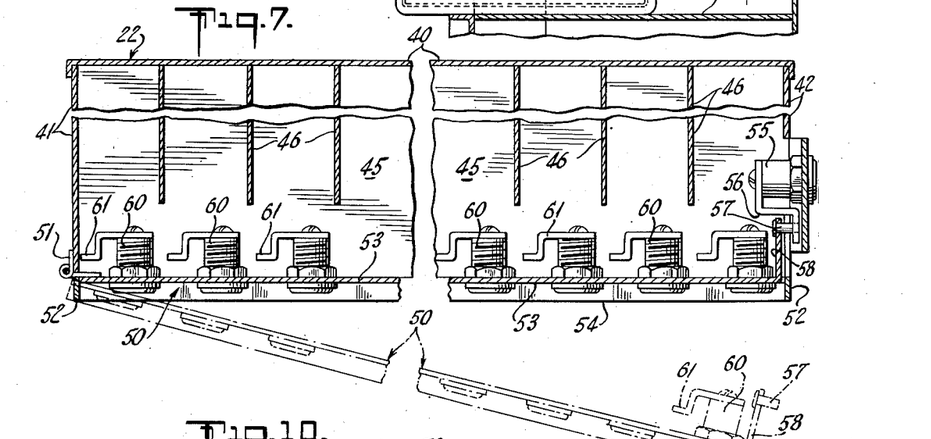
Figure 7 is a horizontal sectional view on the line 7—7 of Figure 6, showing in dot and dash lines the lock carrying frame or grille released by the master lock and swung away from the secondary cabinet or sub-safe to give access to all the money boxes.
Figure 8:
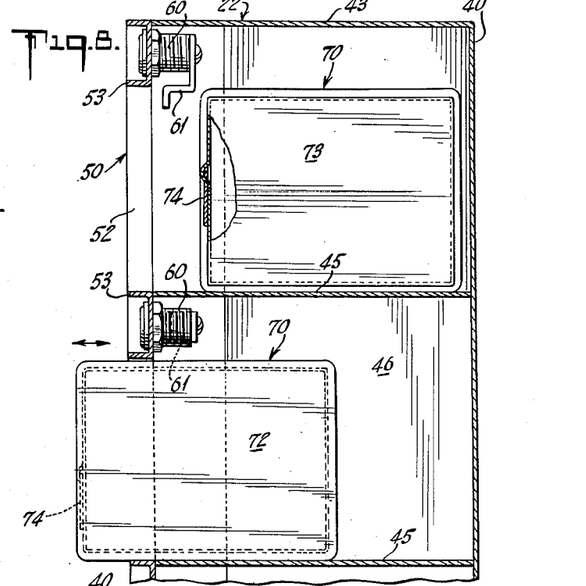
Figure 8 is a vertical sectional view on the line 8—8 of Figure 6.

The sub-safes or secondary cabinets 22 and 26 are substantially alike. Each of them is in the form of a five-sided box having a rear wall 40, side walls 41 and 42, a top wall 43, and a bottom wall 44, as shown in Figures 6, 7 and 8. The secondary cabinet is provided with a number of horizontal shelves or partitions 45 and between these shelves or partitions and the top and bottom walls 43 and 44 the secondary cabinet is provided with vertical partition members indicated at 46. These partitions divide the secondary cabinet into tiers of compartments or pigeon-holes which, in the form shown in Figures 1 to 9, are higher than wide.

A frame 50 is hinged to one side wall (41) of the secondary cabinet in any convenient manner as shown for example at 51. This frame has vertical side members 52, 52, which carry horizontal members, here shown as 53, of channel-shaped cross-section. The number of members 53 equals the number of rows. The upper flange of the channels is opposite each of the shelves 45 and the top 43. Opposite the bottom wall of the secondary cabinet, the frame 50 has a strap 54 similar to strap 52.

Figures 5, 9:
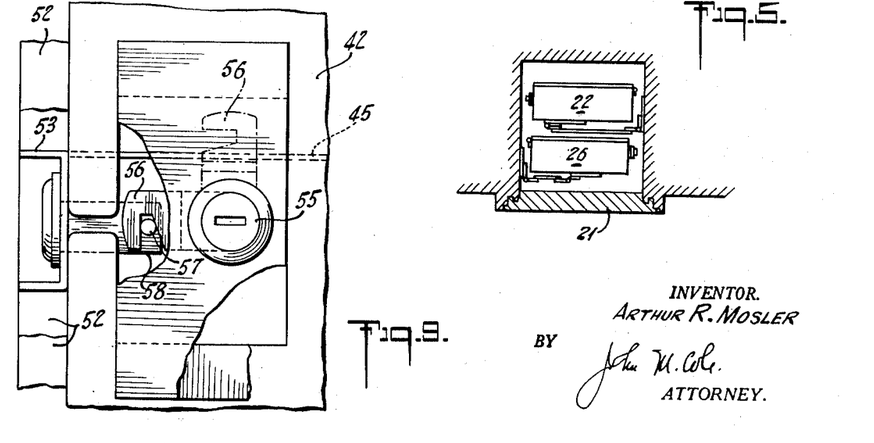
Figure 5 is a view similar to Figure 2 showing the two sub-safes in a recess in the wall.
Figure 9 is a fragmentary side elevational view taken from the right of Figures 6 and 7.
Figure 6:
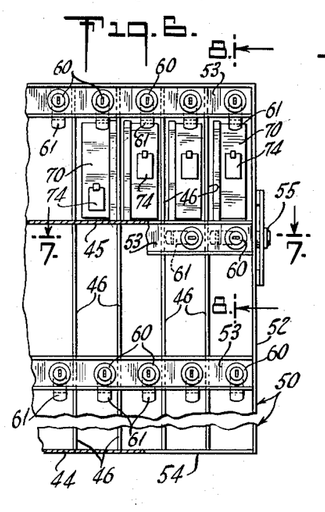
Figure 6 is a front elevational view at an enlarged scale of a secondary cabinet or sub-safe of the type having a swingable grille and showing certain of the money boxes in normal, assigned, positions, others in position indicating no assignment; also showing some of the compartments empty, and the locks in either locked or unlocked position.

As shown in Figures 6, 8 and 9 of the drawings, the side 42 of the secondary cabinet or sub-safe opposite the hinge 51 carries a master lock 55, preferably behind one of the horizontal members 53. This lock has a swingable arm 56 cooperable with a pin 57 carried by a rearwardly extending member 58 attached to the frame 50. When the lock 55 is engaged with the pin as shown in full lines in Figures 8 and 9, the frame 50 is locked across the front of the secondary cabinet.

As here shown, the members 53 of the frame as shown in Figures 1, and 6 to 9 of the drawings extend across the upper part of each of the pigeon-holes or compartments provided by the vertical or horizontal partitions. Each of these cross-bars 53 carries a plurality of locks indicated at 60. Each lock 60 requires an individual key assigned to the sales person. The lock has a swinging arm 61 adapted to be moved from the vertical or pendant position indicated in Figures 1, 6 and 8, to the horizontal position indicated in Figures 6, 7 and 8.

When an arm such as 61 is in the vertical position of Figure 6, it reduces the vertical window space of the compartment it is in front of, and when it is in the horizontal position, full window space is available.

The money box indicated generally at 70 may be in various forms as desired. One such form is indicated more in detail in Figure 10. Here the money box has a plastic coin container 71, a slidable plastic front cover 72 and a metal back cover 73, all as shown more in detail in my application Serial No. 247,031 filed concurrently herewith and now abandoned. The metal back cover may be in the form of a five-sided metal box which carries a swingable tab 74.

Figure 10:
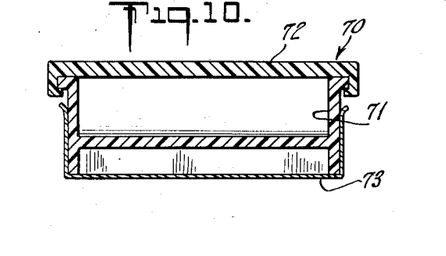
Figure 10 is a cross-sectional view through a combined money-box and paper currency holder adapted to fit the safe construction of Figures 1–9.

An installation such as illustrated in Figure 1 may conveniently care for a money box for 100 sales people. Each cabinet or sub-safe 22 and 26 is provided with 50 compartments, 50 locks and adapted to receive 50 individual money boxes such as indicated in Figures 6, 8 and 10. The tabs 74 may be provided with numbers corresponding with the account number of the sales person and each sales person is assigned a correspondingly numbered pigeon-hole or compartment in which to keep the money box.

As shown in Figures 1 and 6 to 8, the money boxes are vertical and the tabs are arranged to hang down and display the number when they are inserted into the compartments in the position indicated at the upper right of Figure 6 or at the top of Figure 8. If the money box is not assigned, the compartment may be occupied by a money box put in upside down as indicated at the left of Figure 6 or in the bottom of Figure 8, in which case the tab hangs down and shows no number or shows some convenient signal suitable for the purpose. When using the safe or repository discussed herein, each member of the sales force is furnished with a money box 70 and a known amount of change, a number assigned to the box and to the space in the repository where that sales person is to keep the box when not in use. At the close of business and at other times when desired, the sales person can take the money box, together with the change, usually the same amount which was earlier assigned, and after unlocking the proper compartment, insert the money box in place and lock it in so that no other person has access except through the master lock. A large number of sales people can at the close of business for the day place their individual money boxes in the proper compartments and lock them in so that they are safe until the next day and cannot be looked at except by authorized persons who can open the master lock. When returning the next day, the sales person can quickly obtain the money box by using the individual's key in the proper lock.

During the day, when the sales force is about, the repository may remain in the position indicated in Figure 1 with all the compartments accessible to the individuals for insertion or removal of the money boxes. At night, when the store is closed, the sub-safes or storage cabinets 22 and 26 may be moved back into the interior of the safe as indicated in Figures 2 or 5 and the main door closed and locked so that the valuables in the money boxes are in safekeeping until the next day. Access to them may, of course, be had by authorized persons who can open the main safe lock and the master locks. In this way, all funds are in safekeeping at all times either in the custody of the person to whom the particular money is assigned or locked into the sub-safes or main safe, or both. Funds in excess of the amount of money the sales person is to keep in the money box are delivered to the auditors in some other manner by means forming no part of the present invention.

Figure 11:
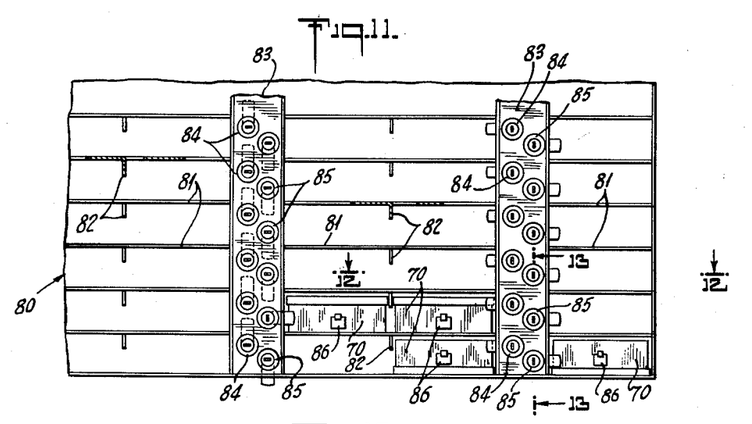
Figure 11 is a view similar to Figure 6 illustrating an arrangement according to which the money boxes are horizontal instead of vertical.
Figure 12:
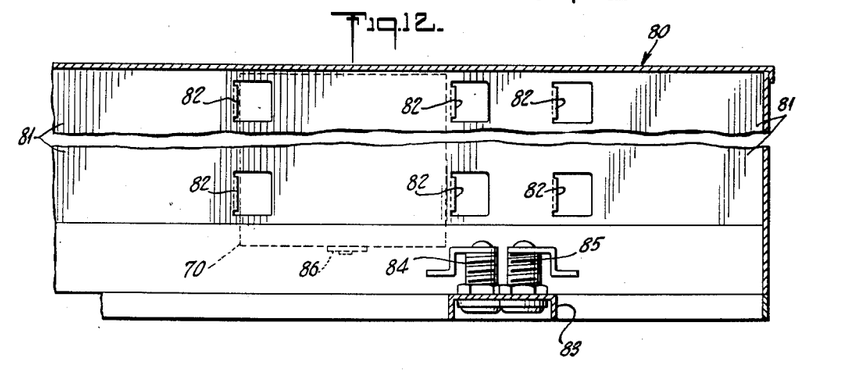
Figures 12 and 13 are fragmentary sectional views on the lines 12—12 and 13—13, respectively, of Figure 11.
Figure 13:
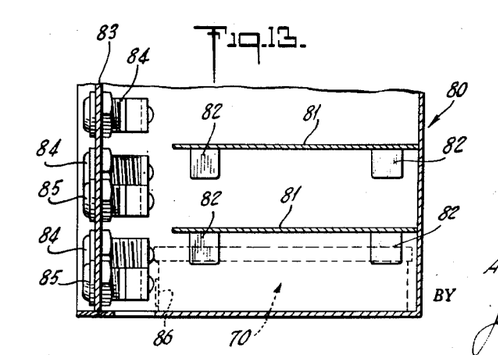

In the modified form of construction illustrated in Figures 11, 12 and 13, the same type of money box 70 is employed. Instead of stacking the money boxes on edge as in the other figures, here the construction is such that the money boxes are put into the sub-safe or storage cabinet 80 in horizontal positions. The cabinet 80 may be a five-sided box as before and it carries a number of horizontal partitions 81, vertically spaced to accommodate the money boxes and provided with prongs 82 spaced to form compartments of the proper width to receive the money box either side up. Here the grille or frame corresponding with the frame 50 of the preceding figures is provided with a suitable number of vertical lock-carrying members 83. These members are spaced from the side elements of the frame and from one another as indicated in Figure 11 so that each lock-carrying member 83 carries two rows of locks 84, 85, the locks 85 cooperating with the boxes 70 to the right of the member 83 and the locks 84 cooperating with the boxes to the left of the members 83. Where the money boxes are intended for use with a compartmented box in which they are kept horizontal instead of vertical, the tabs 86 are hinged so as to swing to one position or the other, depending upon whether the box is right side up or not.

In the construction shown in Figures 14 to 19, the safe 90 (Figure 19) carries two cabinets or sub-safes 91, 92 on hinged plates 93 and 94 in the same manner as the cabinets or sub-safes 22 and 26 of Figures 1 to 5. They are adapted to be housed inside the safe or swung out in front of the safe and held at an angle to one another as indicated in this figure. This position may be secured by a cross link indicated at 95. By disposing the sub-safes at an angle to one another, the traffic to one sub-safe is separated from the traffic to the front of the other sub-safe. The cabinet or sub-safes 91 and 92 are alike, except to economize space they are preferably right and left-handed.

The front or right-hand cabinet 91 is in the form of a laterally opening metal box, and has a rear wall 100, top and bottom walls 101 and 102, side walls 103 and 104. It carries a number of vertical partition plates 105, a number of flat horizontal plates 106 and lower Z-shaped horizontal plate 107 with its lower flange 107' welded to the bottom of the box as indicated in the Figure 16. The vertical partition and horizontal plates may be assembled after the fashion of an egg crate and welded in place. They terminate in the same plane as the front edges of the top, bottom and side walls 100—104.

Figure 15:
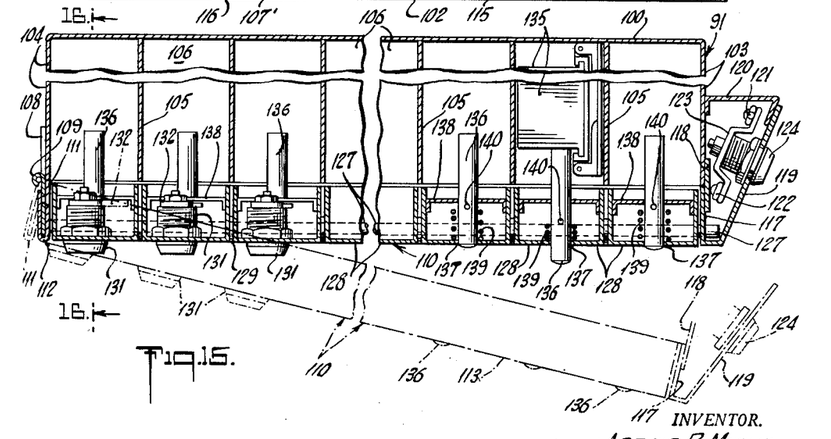
Figure 15 is a horizontal sectional view on the line 15—15 of Figure 14.
Figures 16, 17, 18, 19:
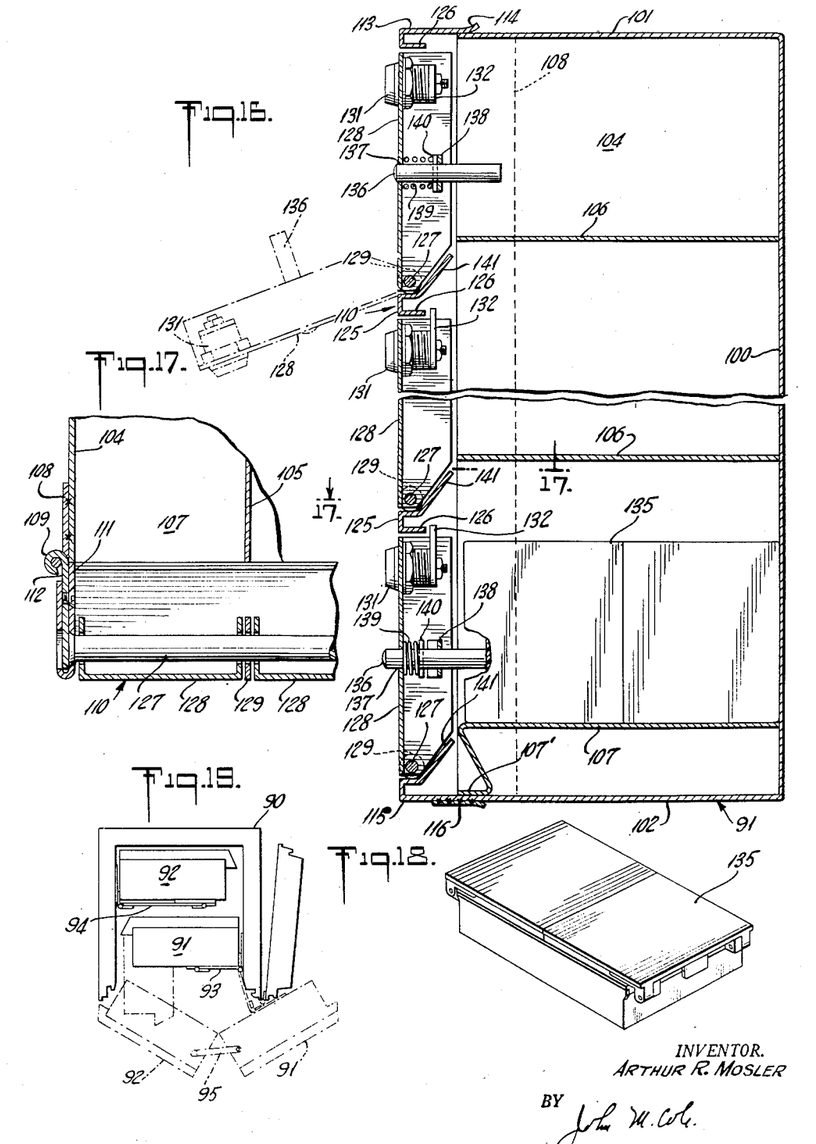
Figure 16 is a vertical sectional view on the line 16—16 of Figure 15.
Figure 17 is a fragmentary sectional view at an enlarged scale on the line 17—17 of Figure 16.
Figure 18 is a perspective view of a modified form of money box such as used in the cabinet of Figures 14 to 17, inclusive.
Figure 19 is a view illustrating a slight modification in which the two secondary cabinets or sub-safes are swung into positions where they face away from one another.

At the left side wall 104 of sub-safe 91 is welded a hinge strip 108 with hinge knuckles 109' for supporting a hinged grille designated generally as 110. This grille has at left a U-shaped side wall 111 (Figures 15, 16 and 17) which receives the other knuckle member 112 of hinge. The side frame member 111 is secured to a channel-shaped top frame member 113, with a long upper side 114 which extends back as indicated in Figure 16 to overlie the top wall 101 of the sub-safe 91. The side member 111 of the frame also carries a lower cross frame member 115 of modified channel shape and having welded to its lower side a strip 116 adapted to extend underneath the bottom wall 102 of the cabinet 91 and maintain the frame in alignment when in closed position. The ends of the horizontal members 113 and 115 remote from the hinge carry a vertical strip 117 of V-shaped channel section, whose inner side is provided with a welded extension 118 adapted to pass by the edge of the side wall 103. The obliquely rearwardly extending flange 119 of strip 117 is adapted to meet a vertical strip 120 welded by the side wall 103. The parts 103, 119 and 120 form a vertical housing adapted to receive two vertical reciprocable rods 121 and 122 carried on a cross-arm 123 actuated by a lock 124. The rods 121 and 122 pass through suitable guides not shown and are adapted to engage with or be disengaged from suitable stops carried by the body of the cabinet 91. This mechanism may be similar to that used in locking the door of a wardrobe.

The grille 110 also includes a number of horizontally extending channels 125 preferably of the same section as the bottom frame forming channel 115. The channels 125 and the top frame member 113 have return flange elements 126 all in a common vertical plane and adapted to act as striker bars or stops for the arms on the locks carried on the doors to be described.

The side members 111 and 117 of the swingable grille or frame carry a number of horizontal rods 127 held against removal by hinge strip 112, and these rods pass through a plurality of doors 128 made of sheet metal and of a height when closed, to occupy substantially the entire space separating the members 125 from 113 and 115, and are of a width slightly less than the width of the pigeon-hole or compartment formed by the vertical and horizontal partitions 105 and 106. Theye are spaced from one another by washers 129.

Figure 14:
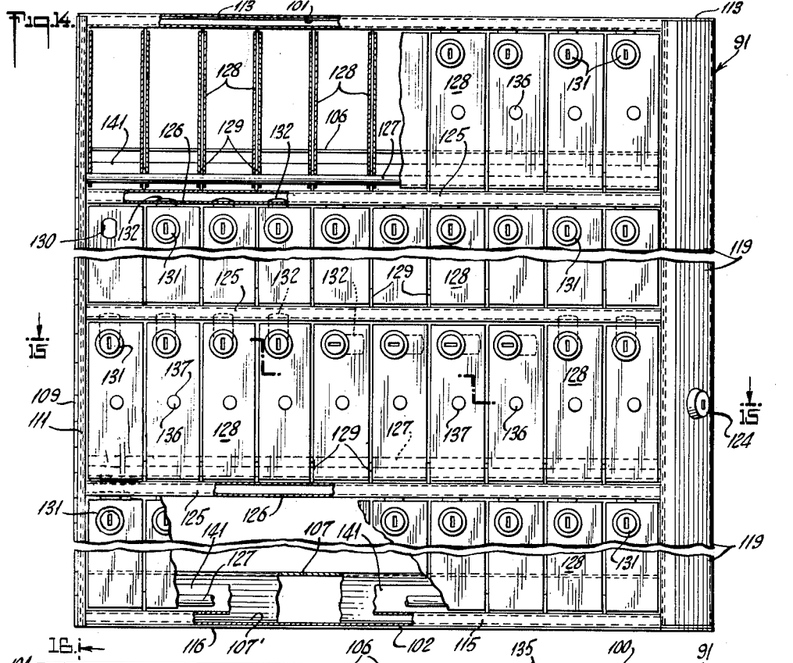
Figure 14 is a front elevational view somewhat similar to Figure 6, illustrating a modified form of construction in which each pigeon-hole is closed by a lockable door carried on a swingable locked frame.

Each of the doors is formed by folding a piece of sheet metal to channel shape so that the doors are stiffened and extend in near the partitions. Near the top of each door is an off-center non-circular opening 130 (indicated at the left of Figure 14) for the reception of a lock 131. This lock is adapted to be operated by an individual key carried by the sales person, and has an arm 132 adapted to be shifted from the vertical to the horizontal position as indicated in Figures 14 and 16. When the arm extends upwardly and the door is in the closed position, the upper end of the arm 132 will be behind the corresponding flange or striker 126 of a horizontal grille member and will hold the door closed; and when the arm is swung to a horizontal position, the door can be swung down as indicated in the dot and dash position in Figure 16.

A money box differing in dimension and detail from the money box shown in Figure 10 is indicated at 135 in Figures 15 to 18. This money box is shown and described in detail in my co-pending application No. 247,032, now Patent No. 2,735,541 filed concurrently herewith. The money box 135 is of the proper dimension to pass through the opening provided when the door is open. When in the compartment, it rests on its side edge on one of the horizontal members 106 or 107, with its front side wall adjacent the front of the pigeon-hole or compartment.

In order that there may be an indication of the absence or presence of the box in the pigeon hole, each door is provided with an indicator. This indicator may be in the form of a short rod 136 of colored plastic, which passes through a hole 137 in the door and an apertured bridging strap 138. The rods 136 are surrounded by springs 139 which act against pins 140, which, in the absence of a money box, urge the rods inwardly as indicated at the right of Figure 15 and at the top of Figure 16. When in this "in" position, the end of the rod 136 may be flush with the face of the door. If, however, the money box is in position as indicated at the bottom of Figure 16 and in one of the showings of Figure 15, the plunger 136 is pushed outwardly by the money box so that the colored plunger may be readily observed and the presence of the money box indicated even though one cannot look into the locked compartment.

The horizontal channel members 115 and 125 have upwardly bent flanges 141, which close off the space between the shelf 106 forming the roof or top of one pigeon-hole and the bottom of the swinging door for the pigeon-hole above, so that foreign objects cannot be inserted into a lower pigeon-hole when the door for the pigeon-hole directly above is opened.

The grille, doors, etc., for the left-hand sub-safe 92 may be the same as for the right-hand one, except that certain of the parts may be made left-handed as is obvious.

In using the arrangement shown in Figures 14 to 19, inclusive, each sales person is provided with a money box 135 and is assigned to a lockable compartment or pigeon-hole and furnished with a key for the corresponding lock and can safely keep the money box in the locked pigeon-hole. Where mass inspection of all the money boxes is desired, the auditor can obtain access to all the boxes by the single lock 124. He can also use a master key if desired to open any single compartment.

Figure 20:
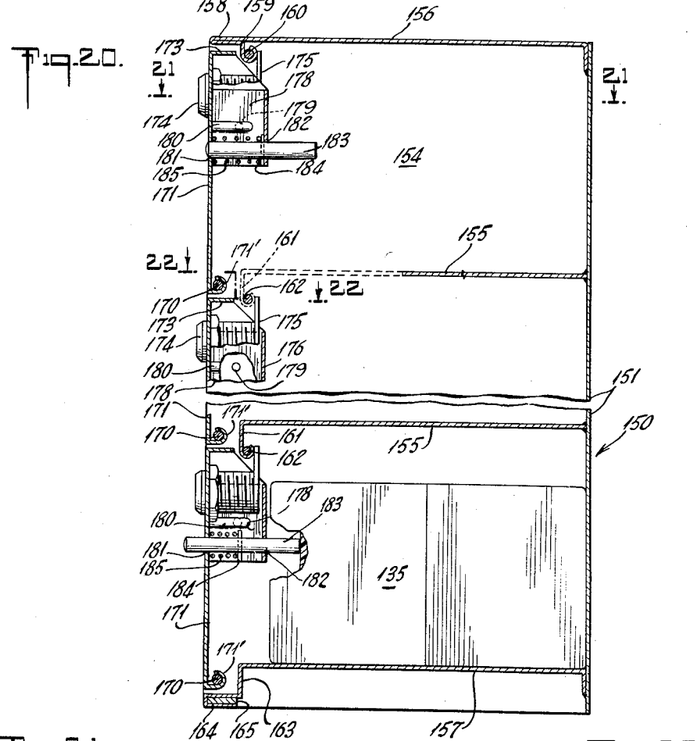
Figure 20 is a vertical sectional view similar to Figure 16, illustrating a modified form of construction in which the lockable doors are carried directly by the body of the cabinet or sub-safe, and taken on the line 20—20 of Figure 21.
Figure 21:
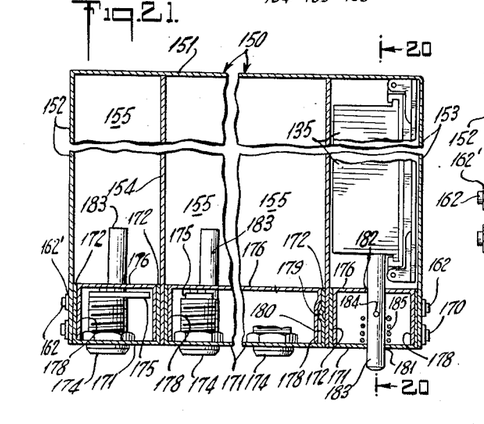
Figures 21 and 22 are horizontal sectional views on the lines 21—21 and 22—22 of Figure 20.
Figure 22:
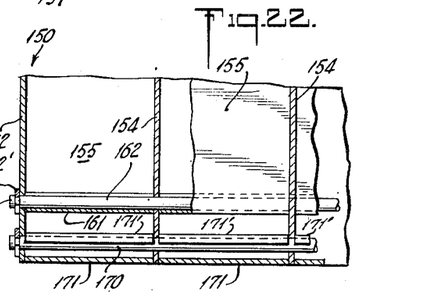

The form of construction illustrated in Figures 20 to 22, inclusive, is intended for use with the same type of money box 135 as above discussed, but is adapted for the employment of a master key in the compartment locks instead of requiring the use of a lockable swingable door or grille. Here the sub-safe 150 has a rear wall 151 and side walls 152, 153 formed by folding the sheet material forwardly to form a channel open at the top and bottom. This channel receives an assemblage which includes a plurality of vertical plates 154, a plurality of horizontal plates 155 assembled in the fashion of an egg crate, a top plate 156 and a bottom plate 157. The top plate 156 is doubled back on itself as indicated at 158 and carries a dependent flange 159 rolled to receive a reinforcing rod 160 and to form a striker bar or stop for the swingable arms of the upper row of locks to be described. Each of the intermediate horizontal crate forming members 155 has a dependent flange 161 spaced the same distance from the back of the cabinet as the flange 159 and similarly rolled to a reinforcing rod 162. The rods 162 may be inserted through the side walls 152 and 153 of the cabinet so as to provide fixed supports for the plates 155 and held in place by spring washers 162'. The lower or bottom plate 157 is downwardly flanged, as indicated at 163 and has a return bend 164 reinforced by a strap 165 as indicated in Figure 20. The assemblage, including the vertical partitions, horizontal partitions, top and bottom wall and reinforcing rod 160 and strap 165 may be welded together and then welded in place to complete the formation of the body of the sub-safe.

Slightly below the level of horizontal members 155 and 157 and near the front of the cabinet, the plates 154 and the side walls 152 and 153 support horizontally extending shafts or rods 170. These rods support doors 171 of channel cross-section and of a size to completely close off the entrances to the corresponding compartments. Each door 171 has a knuckle 171' at the lower end through which the rods 170 pass, rearwardly extending sides 172 adapted to pass between the vertical partitions and vertical sides of the sub-safe, and a rearwardly extending stop flange 173 at the top. Each door carries a lock 174 preferably of the type adapted to be operated by an individual key or by a master key. The locks have arms 175 cooperable with the strikers as indicated in the drawings.

Each door is also provided with a back cover 176 having forwardly extending flanges 178 which pass inside the side flanges 172 of the door and, in order to retain the finishing plate in the desired position, the flanges 172 of the door are provided with bumps 179 and the flanges 178 of the finishing plate with grooves 180, to frictionally engage the bumps.

The door and back cover are provided with aligned apertures 181 and 182 to accommodate an indicator plunger 183, carrying a pin 184 and surrounded by a spring 185. The back cover 176 is readily removable when desired to give access to the lock so that it can be changed.

Two sub-safes or cabinets such as shown in Figures 20–22 may be mounted in a single safe as indicated in Figure 19 for example.

Since it is obvious that the invention may be embodied in other forms and constructions within the scope of the claims, I wish it to be understood that the particular forms shown are but two of these forms, together with modifications of certain parts, and various modifications and changes being possible, I do not otherwise limit myself in any way with respect thereto.

What is claimed is:

1. A pilfer-resistant repository for the safe keeping of cash boxes comprising an external or protective safe having a front opening, a lockable door which when closed and locked prevents access to the interior of the said safe and when opened gives access thereto, an all metal cabinet movably secured to the safe for shifting from a position where it is wholly housed therein through the door opening to a position where it is outside the same, the cabinet in the latter position opening outwardly and having a plurality of vertical and horizontal partitions forming accessible, forwardly opening compartments, a plurality of cash boxes each of a size to be received in a compartment, a frame disposed across the front of the cabinet and having openings through which the boxes may be inserted or removed, compartment locking means for each compartment, including frame-carried locks which, when locked, prevent insertion of, or removal of, a cash box and when unlocked permit the same, and a master lock for locking the frame to the secondary cabinet whereby, when released, access to all the boxes may be obtained without unlocking the frame carried locks.

2. A repository such as claimed in claim 1, wherein the frame includes horizontal bars, each of which carries a row of compartment locking means.

3. A repository such as claimed in claim 1, wherein the each compartment locking means includes a hinged door which closes off the compartment, and a lock carried by each hinged door.

4. A repository such as claimed in claim 1, wherein the compartment locking means includes a compartment closing door hinged about a horizontal axis at the bottom of the compartment to swing down to a substantially horizontal position so as not to interfere with access to neighboring compartments, and a lock carried by each hinged door.

5. In combination, a safe having a lockable door, a sub-safe hingedly supported from the interior of the safe and movable from a position where it is entirely housed within the safe and under the protection of the lockable door to another position where it is in front of the door opening, the sub-safe having a plurality of compartments which open forwardly, when the sub-safe is swung to the outer position, each compartment being adapted to receive a money box of predetermined size, a lockable frame carried by the sub-safe and including frame members spaced to admit insertion and removal of the money boxes, an individual, money box locking device for each compartment, carried by the frame and effective to lock in or release the money box, the lockable frame being movable to a position to bodily shift all the locking devices and open all the compartments.

6. A cabinet for keeping a plurality of small money boxes or the like of predetermined size, the cabinet comprising a metal box having top, bottom, rear and side walls and being open at the front, metal partition-forming members which divide the interior of the box into tiers of compartments side by side, each compartment being of a size to receive one such money box and support it therein in a predetermined position, a metal frame hinged to one side of the box, means carried by the other side of the box for locking the frame across the front of the box, the members forming the frame being, when in locked position, out of the paths of the small boxes to permit insertion and removal thereof, and locking means for each compartment, each of the latter locking means having a frame carried lock with a movable member lockable in a position to prevent movement of the corresponding money box in or out, the frame when unlocked being bodily movable to shift all the latter mentioned locking means out of controlling relation with the money boxes thereby providing simultaneous access to all of the compartments.

7. A cabinet such as claimed in claim 6, wherein the vertical partition-forming members are closer together than the horizontal partition-forming members to form vertical elongated compartments, and the frame members carrying the locking means are horizontal and the movable lockable members thereof extend vertically when in locked position.

8. A pilfer-resistant cabinet for storing a plurality of like money boxes of predetermined length, width and height, comprising a laterally opening metal box having vertical and horizontal partitions forming tiers of compartments side by side, each of a height in excess of the height of the money box and of a length and a width to admit through its front opening a single money box and hold it in position, a grille hingedly secured to one side of the metal box and extending across the front of the metal box, a door for each compartment mounted on the grille to swing about a horizontal axis below and to the front of the bottom of the compartment, the doors each being of a length and width to completely cover, when in vertical position, the front of the corresponding compartment and being swingable downwardly to permit insertion of, or removal of, a money box, each door being provided with a key-operated lock disposed near its upper end and when closed having an arm movable between an upper locking position and lower or unlocking position, and a striker bar mounted on the grill and disposed across each tier of compartments below the top thereof and in a position to be in front of the lock arm when it is in the locking position, and locking means for securing the side of the grille and box remote from the grille hinge together so that all the locked doors may be swung away from all the compartments to afford access to all the compartments.

9. A pilfer-resistant repository for the safekeeping of cash boxes, comprising an external or protective safe having a front opening, a lockable door which when closed and locked prevents access to the interior of the said safe and when opened gives access thereto, an inner cabinet in the form of a pilfer-resistant box with metal back, top, bottom and side walls, and having a plurality of vertical partitions extending from top to bottom and horizontal partitions extending from side to side and forming five-sided, rectangular compartments, supporting means for the cabinet including a vertical hinge pin carried by one inner side wall of the protective safe, a vertical hinge pin carried by the cabinet and a strap interconnecting the hinge pins, the cabinet being shiftable from a position where it is wholly mounted in the protective safe through the front opening to a position where it is outside the safe and the compartments open forwardly, a plurality of cash boxes each of a size to be received in a compartment, and compartment locking means for each compartment, which, when locked prevents insertion of, or removal of, a cash box and when unlocked permits the same, so that all the boxes may be locked in the safe when the cabinet is in the inner position and each money box may be separately accessible when the cabinet is in the outer position and the corresponding locking means unlocked, wherein the compartment locking means includes a compartment closing door hinged about a horizontal axis at the bottom of the compartment to swing down to a substantially horizontal position so as not to interfere with access to neighboring compartments, and a lock carried by each hinged door.

10. A pilfer-resistant cabinet for storing a plurality of like money boxes of predetermined length, width and height, comprising a laterally opening metal box having a back wall, top, bottom and side walls and vertical and horizontal partitions forming tiers of forwardly opening compartments side by side, each of a height in excess of the height of the money box and of a depth and width to admit through its front opening a single money box and hold it in position, a plurality of horizontal striker bars, one carried underneath the top wall of the metal box and each of the others carried underneath a horizontal partition, the striker bars being disposed rearwardly of the face of the box, a plurality of horizontal rods, one disposed in front of the bottom of the box and each of the others in front of the horizontal partition and above the adjacent striker bar, a row of compartment-closing doors hingedly carried by each horizontal rod, and a lock carried by each door and cooperable with the striker bar above the door for locking the compartment closed.

11. A pilfer-resistant cabinet such as claimed in claim 10, wherein each door has a top flange which provides a stop member engageable with the front of the striker bar to limit movement of the door.

12. A pilfer-resistant cabinet such as claimed in claim 10, wherein the vertical partitions extend to the front face of the cabinet and the doors have side flanges which pass in between the partitions when the doors are closed.

13. A pilfer-resistant repository for the safe-keeping of cash boxes, comprising an external or protective safe having a front opening, a lockable door which when closed and locked prevents access to the interior of the said safe and when opened gives access thereto, an inner cabinet in the form of a pilfer-resistant box with metal back, top, bottom and side walls, and having a plurality of vertical partitions extending from top to bottom and horizontal partitions extending from side to side and forming accessible, forwardly opening five-sided, rectangular compartments, the cabinet being supported from and movably secured to the safe for shifting from a position where it is wholly housed therein through the door opening to a position where it is outside the same and opens forwardly, a plurality of cash boxes each of a size to be received in a compartment, and compartment locking means for each compartment, which, when locked prevents insertion of, or removal of, a cash box and when unlocked permits the same, so that all the boxes may be locked in the safe when the cabinet is in the inner position and each money box may be separately accessible when the cabinet is in the outer position and the corresponding locking means unlocked, and a second inner cabinet with similar partitions and box lockable means and additional similar boxes, the support for each of the inner cabinets including two vertical hinges which permit swinging each cabinet through at least 180° so that they face backwardly when housed in the safe, one set of hinges disposing its cabinet to the right of the door opening, the other set disposing its cabinet to the left of the door opening, the support for one cabinet including a vertical hinge pin and a short strap, and the support for the other cabinet including a vertical hinge pin farther to the rear than the first hinge pin and a longer strap.

14. A pilfer-resistant repository for the safe-keeping of cash boxes, comprising an external or protective safe having a front opening, a lockable door which when closed and locked prevents access to the interior of the said safe and when opened gives access thereto, an inner cabinet in the form of a pilfer-resistant box with metal back, top, bottom and side walls, and having a plurality of vertical partitions extending from top to bottom and horizontal partitions extending from side to side and forming accessible, forwardly opening five-sided, rectangular compartments, the cabinet being supported from and movably secured to the safe for shifting from a position where it is wholly housed therein through the door opening to a position where it is outside the same and opens forwardly, a plurality of cash boxes each of a size to be received in a compartment, and compartment locking means for each compartment, which, when locked prevents insertion of, or removal of, a cash box and when unlocked permits the same, so that all the boxes may be locked in the safe when the cabinet is in the inner position and each money box may be separately accessible when the cabinet is in the outer position and the corresponding locking means unlocked and a second inner cabinet with similar partitions, and box lockable means and additional similar boxes, the support for each of the inner cabinets including two vertical hinges which permit swinging each cabinet through at least 180° so that they face backwardly when housed in the safe, one set of hinges disposing its cabinet to the right of the door opening, the other set disposing its cabinet to the left of the door opening, the support for one cabinet including a vertical hinge pin and a short strap, and the support for the other cabinet including a vertical hinge pin farther to the rear than the first hinge pin and a longer strap, and means to releasably secure the two cabinets in fixed outside positions.

15. A pilfer-resistant repository for the safe-keeping of cash boxes, comprising an external or protective safe having a front opening, a lockable door which when closed and locked prevents access to the interior of the said safe and when opened gives access thereto, an inner cabinet in the form of a pilfer-resistant box with metal back, top, bottom and side walls, and having a plurality of vertical partitions extending from top to bottom and horizontal partitions extending from side to side and forming accessible, forwardly opening, five-sided, rectangular compartments, the cabinet being supported from and movably secured to the safe for shifting from a position where it is wholly housed therein through the door opening to a position where it is outside the same and opens forwardly, a plurality of cash boxes each of a size to be received in a compartment, and compartment locking means for each compartment, which, when locked prevents insertion of, or removal of, a cash box and when unlocked permits the same, so that all the boxes may be locked in the safe when the cabinet is in the inner position and each money box may be separately accessible when the cabinet is in the outer position and the corresponding locking means unlocked and a second inner cabinet with similar partitions and box lockable means and additional similar boxes, the support for each of the inner cabinets including two vertical hinges which permit swinging each cabinet through at least 180° so that they face backwardly when housed in the safe, one set of hinges disposing its cabinet to the right of the door opening, the other set disposing its cabinet to the left of the door opening, the support for one cabinet including a vertical hinge pin and a short strap, and the support for the other cabinet including a vertical hinge pin farther to the rear than the first hinge pin and a longer strap and means to releasably secure the two cabinets in fixed outside oblique positions so that the compartments in the right-hand cabinet face to the right and those in the left-hand cabinet face to the left.

References Cited in the file of this patent
UNITED STATES PATENTS

| | | |
|---|---|---|
| 941,052 | Wing | Nov. 23, 1909 |
| 1,023,425 | Harrison | Apr. 16, 1912 |
| 1,227,799 | Kaub | May 29, 1917 |
| 1,362,949 | Lillard | Dec. 21, 1920 |
| 1,434,061 | Lewis | Oct. 31, 1922 |
| 1,513,095 | Dieckmann | Oct. 28, 1924 |
| 1,607,121 | Doran | Nov. 16, 1926 |